(12) United States Patent
Lorhpipat et al.

(10) Patent No.: US 7,794,343 B2
(45) Date of Patent: Sep. 14, 2010

(54) MKV TAKRAW BALL

(75) Inventors: Boonchai Lorhpipat, Sampran Nakhonpathom (TH); Boonsakdi Lorpipatana, Sampran Nakhonpathom (TH)

(73) Assignee: Satian Industries Company, Ltd. (TH)

( * ) Notice: Subject to any disclaimer, the term of this patent is extended or adjusted under 35 U.S.C. 154(b) by 202 days.

(21) Appl. No.: 11/718,933

(22) PCT Filed: Apr. 12, 2005

(86) PCT No.: PCT/GB2005/001403

§ 371 (c)(1),
(2), (4) Date: May 9, 2007

(87) PCT Pub. No.: WO2006/051248

PCT Pub. Date: May 18, 2006

(65) Prior Publication Data

US 2007/0254754 A1    Nov. 1, 2007

(30) Foreign Application Priority Data

Nov. 10, 2004    (GB)    ................... 0424863.9

(51) Int. Cl.
*A63B 39/00*    (2006.01)

(52) U.S. Cl. .................. 473/612; 473/596; 473/614

(58) Field of Classification Search ............... 473/596, 473/612, 614

See application file for complete search history.

(56) References Cited

U.S. PATENT DOCUMENTS

| 3,506,265 | A | * | 4/1970 | Yugi ........................... 473/604 |
| 4,187,134 | A | * | 2/1980 | Svub et al. ................... 156/170 |
| 5,865,697 | A | * | 2/1999 | Molitor et al. .............. 473/605 |
| 6,022,283 | A | * | 2/2000 | Schindler et al. ............ 473/605 |
| 6,099,423 | A | * | 8/2000 | Ou .............................. 473/604 |
| 6,206,795 | B1 | * | 3/2001 | Ou .............................. 473/599 |
| 6,544,133 | B2 | * | 4/2003 | Ou .............................. 473/604 |

FOREIGN PATENT DOCUMENTS

| GB | 2196861 A | 5/1988 |
| GB | 2408214 A | 5/2005 |
| WO | 95/28206 A1 | 10/1995 |

OTHER PUBLICATIONS

International Search Report (PCT/GB2005/001403).

\* cited by examiner

*Primary Examiner*—Gene Kim
*Assistant Examiner*—Joseph B Baldori
(74) *Attorney, Agent, or Firm*—Sutherland Asbill & Brennan LLP

(57) ABSTRACT

A takraw ball is woven from takraw ball strips of springy material having soft material pads mounted into recesses in a strip face, the pads are, at least in part, bounded by strip face parts which function to lend stiffness to the strip, and/or protect pad edges and/or assist in mounting pads onto the strips.

17 Claims, 3 Drawing Sheets

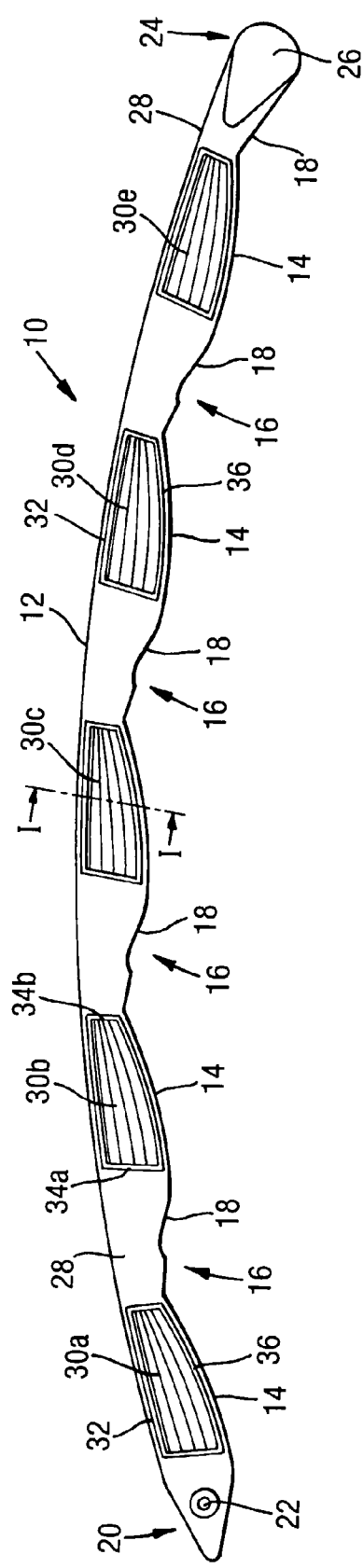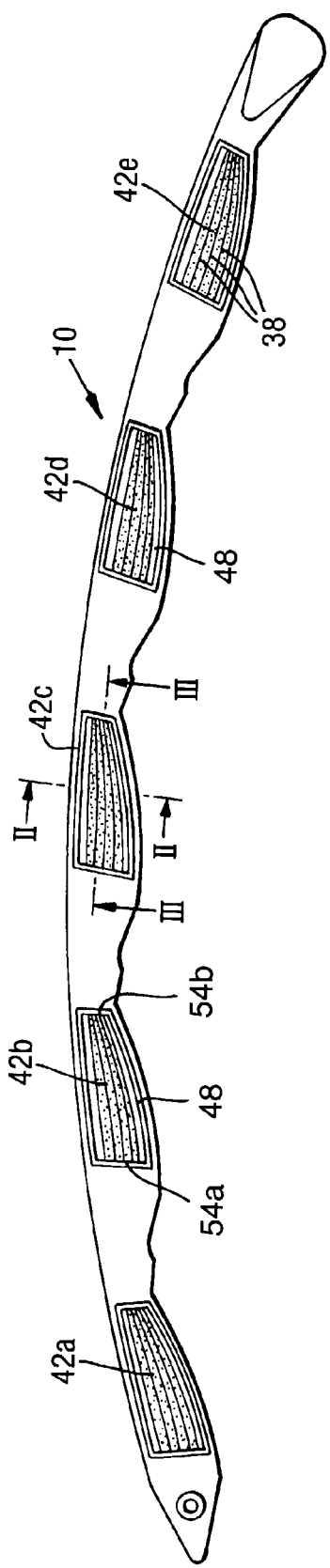

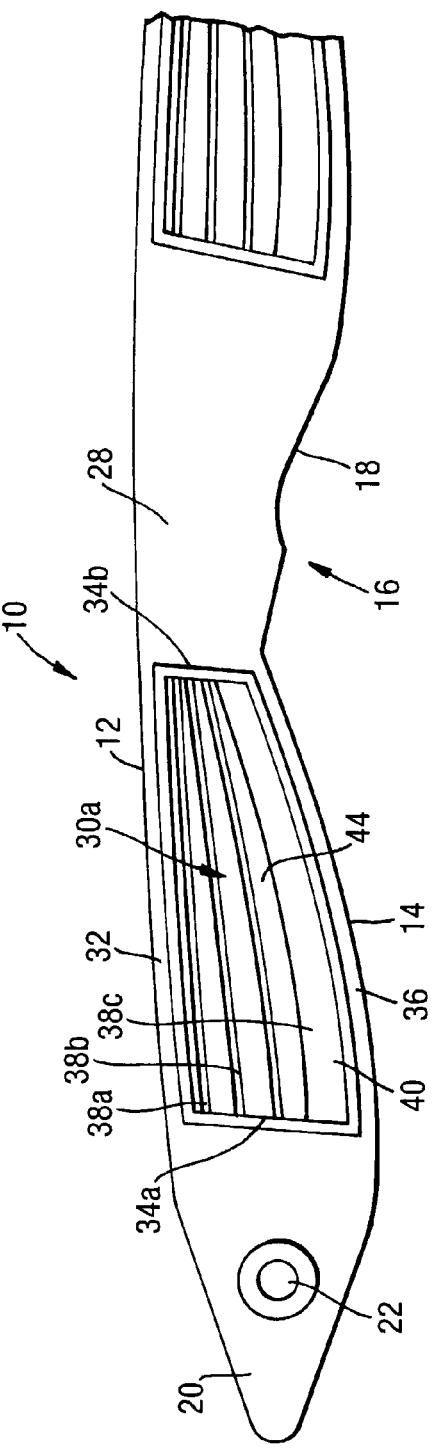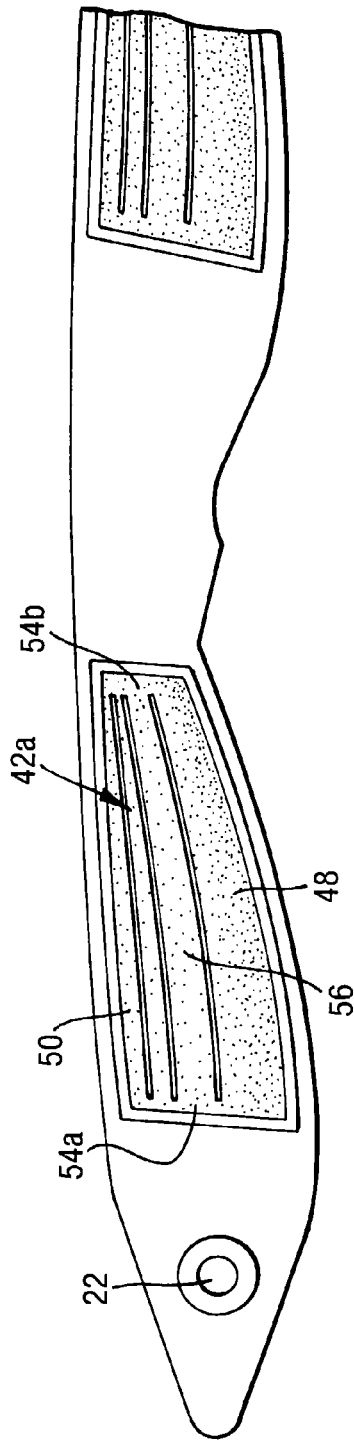

MKV TAKRAW BALL

CROSS-REFERENCE TO RELATED APPLICATIONS

This is a submission pursuant to 35 U.S.C. 154(d)(4) to enter the national stage under 35 U.S.C. 371 for PCT/GB05/001403, filed Apr. 12, 2005. Priority is claimed under 35 U.S.C. 119(a) and 35 U.S.C. 365(b) to Great Britain Patent Application No. 0424863.9, filed Nov. 10, 2004.

TECHNICAL FIELD

This invention relates to takraw balls and it particularly relates to takraw ball strips of plastics material, takraw balls woven from takraw ball strips and methods of manufacture of takraw ball strips.

BACKGROUND OF THE INVENTION

Sepak Takraw is played by opposing teams passing a takraw ball across a chest-high net using feet, knees, head, shoulders etc., i.e. every part of the body except the player's hands and arms. The object of the game is to ground the ball in the opposing team's court; the rules of the game are similar to volleyball. Another form of takraw is hoop takraw, only one team plays at a time and the players co-operate to get the ball into a vertically orientated hoop some 5 meters above the ground.

DESCRIPTION OF RELATED ART

Document GB-A-2,196,861 (Lorhpipat) describes the manufacture of traditional takraw balls by conventionally weaving split rattan strips into a spherical basket and the manufacture of takraw balls by forming strips of plastics material into interwoven hoops. As shown by FIG. 1 of Document GB-A-2,196,861, a takraw ball 1 has a spherical structure woven from strips 2, 3 of plastics material with a regular array of openings.

Document WO-A-95/28206 (Satian Industries Co. Ltd.) discloses a takraw ball woven from strips at least a majority of which are composite strips having one component part of soft material and another component part of springy material; the soft material and the springy material being selected to produce a given bounce characteristic. In an embodiment the composite strip is formed and arranged such that, when woven into a ball, at least the exposed outer surface of the ball is constituted by said soft part.

A problem with takraw balls made in accordance with Document WO-A-95/28206 is the maintenance of bounce characteristics with regulation ball weight and size against impact force absorption (softness). For example, a regulation Sepaktakraw ball shall be spherical of one woven layer having 12 holes, 20 intersections. It shall be made of synthetic fibre or natural rattan. If it is made of rattan, it shall consist of 9-11 strains. The circumference shall not be less than 0.42 m and not more than 0.44 m (0.43 m to 0.45 m for women). The weight before play shall not be less than 170 gm and not more than 180 gm (150 gm to 160 gm for women). For more information see www.takrawworld.com. a reduction in diameter to 0.40 m is currently being proposed, as is a larger 0.425 m 190 gm ball.

It is an object of the present invention to increase the impact or shock absorption of a regulation takraw ball, whilst retaining requisite bounce characteristics and/or durability.

BRIEF SUMMARY OF THE INVENTION

According to the present invention, a takraw ball strip of springy material has pads of soft material on one strip face with at least part of the periphery of each pad bounded by the strip face. A takraw ball strip is herein defined as a strip of thin, elongate, springy material that can be joined by its ends to form a hoop and woven into a takraw ball. The strip face boundaries have one or more of the following functions:— to lend stiffness to the strip;

to protect pad edges;

to assist in mounting pads onto the strips.

According to an embodiment of the present invention, each takraw ball strip has recesses to receive pads.

According to a further embodiment of the present invention, the takraw ball strip has a convex-side edge with a radially thickened boundary lip, at least in the vicinity of a recess.

According to a yet further embodiment of the present invention, the takraw ball strip has a sinusoidal-side edge with a radially thickened boundary lip, at least in the vicinity of a recess.

The pads may have a rounded and longitudinally ribbed upper surface and taper both transversely and longitudinally.

A method of manufacturing a takraw ball strip according to the present invention comprises the steps of:— i) moulding a strip of springy material;

and, ii) moulding pads of soft material to a face of the strip;

the strip face being formed to bound at least part of the periphery of each pad.

An embodiment of the method of the present invention comprises the steps of:— i) moulding the strip face with a series of recesses;

and, ii) moulding the pads into the recesses.

The present invention also includes takraw balls woven from takraw ball strips in accordance with the present invention. In a takraw ball in accordance with an embodiment of the present invention, the pads are limited to only those areas of the takraw ball strip which, when woven into a ball, constitute the exposed outer surface thereof.

BRIEF DESCRIPTION OF THE DRAWINGS

The above and further features of the present invention are illustrated, by way of example, in the Drawings, wherein:—

FIG. 1 is a plan of a takraw ball strip in accordance with a first embodiment of the present invention and prior to moulding pads thereon;

FIG. 3 is an enlarged plan detail of the strip and some of the recesses of FIG. 1;

FIG. 4 is a plan of a strip in accordance with the first embodiment with pads moulded thereon;

DETAILED DESCRIPTION OF EMBODIMENTS OF THE INVENTION

The takraw ball of the present invention is a development of the takraw balls described in Document GB-A-2,196,861 (Lorhpipat) and WO-A-95/28206 (Satian Industries Co. Ltd.); both of which documents are incorporated by reference herein.

Figure 2:
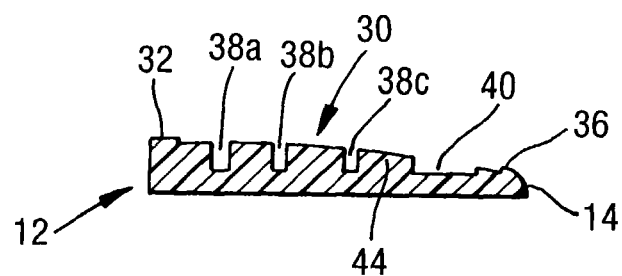
FIG. 2 is an enlarged cross-section through a strip recess on the line I-I of FIG. 1.

FIGS. 1 to 3 show a takraw ball strip 10 to be a, thin, elongate, generally flat moulding of springy, thermo-plastic material, such as an engineering plastic, having a convex-side edge 12 of constant radius and the other side edge of sinusoidally undulating profile having five equispaced peaks 14 and intervening troughs 16. Each trough is also asymmetric, with a notch 18 to one side thereof.

One end 20 of the strip 10 tapers to a point and has a hole 22 whilst the other end 24 has a depression 26 in the upper face 28; the depression 26 being shaped to accommodate the pointed end of the strip and leave a flush upper surface to the hoop joint. A pop rivet (not shown) is passed through hole 22 and a complimentary hole drilled through depression 26 to join the ends of the strip 10 together and form a frusto-conical hoop.

The strip is approximately 40.5 cm. long, has a maximum width of 2 cm. and a maximum thickness of 3 mm. It is moulded from a polyolefin blend, that is a homogeneous blend including polyethylene and polypropylene the proportions of which are varied to suit the particular application for which the takraw ball is to be used; from beginners to amateurs to professional competition players.

The upper strip face 28 has a series of five moulded, generally rectilinear recesses $30_{a,b,c,d,e}$ in the regions of the peaks 14 and equispaced between the troughs 16. The boundaries of each recess define a side edge lip 32, parallel to convex-side edge 12, a pair of opposed transverse ends $34_{a,b}$ and a peak-side lip 36, parallel to peak 14. Each recess has a series of three longitudinal, U-section grooves $38_{a,b,c}$ and a fourth, flat-bottomed, wider groove 40, proximate peak-side lip 36. In an alternative, unillustrated, embodiment the U-section grooves may be formed with an undercut; either during moulding or pressed-in after moulding.

Pads $42_{a,b,c,d,e}$ of soft resilient material are provided in respective recesses $30_{a,b,c,d,e}$. Takraw ball strips 10 are placed in a mould wherein the pads are injection moulded to the strip; the mould is arranged so that maximum temperature occurs at the or each cavity gate, which is aligned with a recess into which a pad is to be moulded. The temperature is sufficient melt the recess surface without melting the surrounding upper face of the strip and provides good adhesion between the pad and recess.

We have found that, for a maximum pad thickness of 3 mm., spongy materials such as polyurethane (PU) or polyethylene (PE) foam do not provide sufficient shock absorption; although they have light weight. Elastomeric materials such as a thermoplastic elastomer (TPE) and synthetic rubbers, such as polypropylene (PP) have proved to provide sufficient shock absorption within the above-given pad thickness limit. However, these materials are relatively heavy (PP density is 0.98, and TPE is 1). This constrains ball design. The greater the thickness of TPE, the softer the feel and greater shock absorbency, the ball can provide. However, the greater the thickness of TPE, the lighter the takraw ball strip has to be to meet overall total ball weight. If the weight of the takraw ball strip is reduced, the thickness of takraw ball strip is forced to be thin with consequential loss of bounce. The design of takraw balls in accordance with the present invention has been optimised to provide a ball with requisite bounce characteristics, weight and circumference within the regulation range and sensible, soft feel and shock absorption.

The takraw ball strip has been designed to have maximum bending moment or modulus with minimum weight. Referring to FIG. 2, maximum strip radial thickness has been retained along the whole length of convex-side edge 12; strip thickness tapering towards the sinusoidal edge 14, 16. This effectively leaves that boundary of recess 30 parallel to strip side edge 12 as a stiffening lip 32. The grooves 38, 40 within the recesses both locally reduce strip thickness (saving weight) and provide mechanical keys to improve adhesion between pad and strip. The broader recess surface 44 between groove $38_c$ and 40 also helps to locally stiffen the strip and the increased surface area of groove 40 again improves the bond between pad and strip. The mechanical bond is further improved by the aforesaid, unillustrated, undercut grooves.

Figure 5:
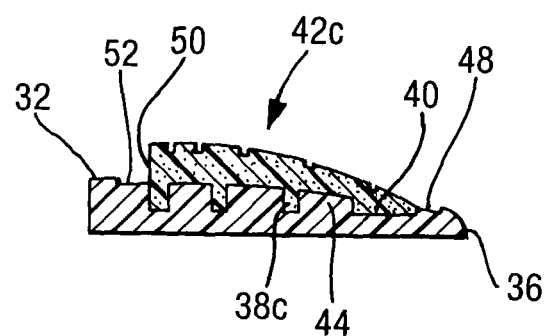
FIG. 5 is an enlarged cross-section through a pad and recess on the line II-II of FIG. 4.
Figure 6:
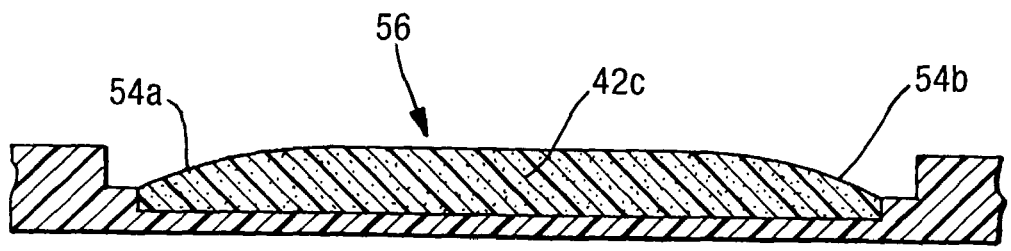
FIG. 6 is an enlarged longitudinal section through a pad and recess on the line III-III of FIG. 4; and, FIG. 7 is an enlarged plan detail of the strip and some of the pads and recesses of FIG. 4.

The pads 42 are moulded to have a curved upper surface, as shown in FIGS. 5 and 6, with the peak-side edge 48 and transverse ends $54_{a,b}$ all lower than the opposed recess boundaries 36, $34_{a,b}$ respectively. Strip, peak-side, boundary 36 is a radially thickened lip higher than pad peak-side edge 48 so that, when a ball hits a floor surface, it falls on the "sweet spot" constituted by the pad surface proximate peak-side edge 48. If the ball hits the floor surface at a glancing angle, the pad peak-side edge will be subjected to a shear force generated by side thrust on the ball and this will tend to peel the soft pad from the takraw ball strip, little-by-little shortening the pad life. Strip recess peak-side boundary 36 is an upstanding lip protecting the pad from being damaged by such shear forces. As hooped strip side edges 12 abut one another in a woven takraw ball, there is no need to similarly protect pad side edge 50; indeed this edge need not be tapered and can be of equal or greater radial height than convex-side lip 32.

When a ball hits the floor or when it is struck, the whole ball is squeezed into an ovoid shape, with hooped strips displacing and sliding over one another, especially at intersection points (See Page 2 lines 95 to 110 of Document GB-A-2,196,861). One hooped strip often slides over or on top of the pad on an adjacent hooped strip, returning to an original, rest position when the ball bounces back from the floor and resumes a spherical shape.

We have found that moulding the pad to leave free an approximately 2 mm. wide length 52 of recess 30 immediately inside convex-side lip 32 and to leave transverse pad ends $54_{a,b}$ each short of recess transverse ends $34_{a,b}$ assists a displaced, overlying hooped strip to return to its rest position; i.e. it reduces overlying hoops from binding one on another. The coefficient of friction of the softer pad material is inevitably greater than that of the springy strip material and resists sliding of an overlying hooped strip. Also, this 2 mm free margin provides a flat surface to the edge of the pad mould so that, during the moulding process, pad material does not leak out of the designed pad area; to leave moulded strips with neat, clearly defined, flash-free edges that do not require post-moulding trimming.

The curved shape of the pad provides maximum height at the central area thereof, to maximise cushioning; whilst the transverse and longitudinal tapering of the pad also assist return of displaced hooped strips. Additionally, the taper of the pad surface towards peak-side edge 40 assists in preventing peeling of that side edge from the recess.

The upper surface 56 of the soft pad 42 has longitudinal ribs, to reduce weight of pad material.

The transverse taper of the strips and the curved shape of the pads also contribute to the overall spherical shape of a woven ball.

A takraw ball is woven from pairs of hooped strips; each formed by a takraw ball strip 10 as shown by FIGS. 1 to 7.

In a further, unillustrated embodiment the takraw ball is woven with an additional central hoop positioned between opposed side hoop pairs and is generally equivalent to central hoop 3 of Document GB-A-2,196,861 (Lorhpipat) or centre strip 26 of Document WO-A-95/28206 (Satian Industries Co. Ltd.). The effect of a central hoop is that the weave of the ball can be looser than with a two-hoop ball; resulting in a softer feel to the ball and a reduction in the above-described displacement and binding of overlying hoops. This means that the takraw ball strips do not need side edge lip and/or pad-free recess length; such that the convex pad side edge is flush with the convex strip side edge.

The foregoing is provided for the purpose of illustrating, explaining and describing embodiments of the present invention. Further modifications and adaptations of these embodiments will be apparent to those skilled in the art and may be made without departing from the spirit of the invention or the scope of the following claims. For instance, different shapes and sizes of takraw ball strips than those illustrated can be used. Similarly, a takraw ball could be woven from differing numbers of strips.

The invention claimed is:

1. A takraw ball woven from molded strips of springy material, wherein each strip comprises:
   an upper face with a series of recesses therein;
   boundaries of each recess defining opposed first and second side lips and ends; and
   a pad of soft material respectively in each recess and having opposed first and second side edges each respectively adjacent a first or second recess side lip, wherein:
   the radial height of said first recess side lip is higher than the radial height of said first pad side edge; and
   the radial height of said second recess side lip is equal to or lower than the radial height of said second pad side edge.

2. The takraw ball of claim 1, wherein the exposed parts of the strip face comprise radially thickened boundary lips in the vicinity of a recess.

3. The takraw ball of claim 2, wherein the bottom of each recess comprises longitudinal grooves.

4. The takraw ball of claim 3, wherein one of said strip side boundaries comprises a sinusoidal-side edge with a radially thickened boundary lip that includes said first recess side lip radially higher than the radial height of said first pad side edge.

5. The takraw ball of claim 4, wherein the other of said side lip boundaries comprises a convex-side edge with a radially thickened boundary lip that includes said second recess side lip radially equal to or lower than the radial height of said second pad side edge.

6. The takraw ball of claim 5, wherein the pads comprise opposed ends lower than adjacent recess boundary ends.

7. The takraw ball strip of claim 6, wherein each pad comprises a curved upper surface.

8. The takraw ball of claim 7, wherein each pad tapers transversely or longitudinally.

9. The takraw ball strip of claim 8, wherein each pad leaves free a length of recess immediately inside the convex-side lip and transverse pad ends are short of recess transverse ends.

10. The takraw ball of claim 9, wherein the upper surface of each pad is longitudinally grooved.

11. The takraw ball of claim 10, wherein at least a portion of the pads are molded from elastomeric material.

12. The takraw ball of claim 1, wherein at least a portion of the strips are molded from at least one thermo-plastic engineering plastics material.

13. The takraw ball of claim 12, wherein the at least one thermo-plastic engineering plastics material comprises a polyethylene and polypropylene blend.

14. The takraw ball of claim 11, wherein the elastomeric material comprises at least one of the following: a thermo-plastic elastomer or a synthetic rubber.

15. The takraw ball of claim 1, wherein the pads are limited to only those parts of strip faces which, when woven into a takraw ball, will constitute the exposed outer surface of said takraw ball.

16. The takraw ball of claim 15, wherein the ball is woven from pairs of hooped takraw ball strips.

17. The takraw ball of claim 16, wherein the paired, hooped takraw ball strips are separated by a hooped centre strip.

* * * * *